United States Patent [19]

Knothe et al.

[11] 4,401,176

[45] Aug. 30, 1983

[54] ELECTRONIC WEIGHER WITH A WEIGHING SCALE LOCATED ABOVE THE WEIGHER CASING

[75] Inventors: Erich Knothe, Bovenden; Franz-Josef Melcher; Jürgen Ober, both of Hardegsen; Walter Södler, Pforzheim-Bü.; Veronika Martens, Göttingen, all of Fed. Rep. of Germany

[73] Assignee: Sartorius GmbH, Fed. Rep. of Germany

[21] Appl. No.: 347,626

[22] Filed: Feb. 10, 1982

[30] Foreign Application Priority Data

Feb. 21, 1981 [DE] Fed. Rep. of Germany ... 8104877[U]

[51] Int. Cl.³ .................... G01G 21/00; G01G 23/48
[52] U.S. Cl. .................................. 177/180; 177/189; 177/264
[58] Field of Search ............... 177/124, 179, 180, 184, 177/189, 210 EM, 238, 253, 264

[56] References Cited

U.S. PATENT DOCUMENTS

| 3,166,133 | 1/1965 | Hall | 177/180 X |
| 3,186,505 | 6/1965 | Vinzelberg | 177/210 EM |
| 4,285,412 | 8/1981 | Wirth | 177/180 X |

*Primary Examiner*—Joseph W. Hartary
*Attorney, Agent, or Firm*—Eric P. Schellin

[57] ABSTRACT

Electronic weigher apparatus is disclosed which utilizes a plate situated below the weighing scale and above a load receiver which is part of an electronic weight measuring system. The plate is shaped in such a way that thermal air currents generated by the electronic apparatus are carried through a low air resistance path from the interior to the exterior of the weigher casing while a high resistance airflow path prevents air currents from being carried upward from the electronic apparatus to the weighing scale. A collar encircling the scale prevents external air currents from disturbing it during the loading operation.

8 Claims, 2 Drawing Figures

ELECTRONIC WEIGHER WITH A WEIGHING SCALE LOCATED ABOVE THE WEIGHER CASING

BACKGROUND OF THE INVENTION

The invention relates to an electronic weigher with a weighing scale located above the weigher casing and supported, via a connecting piece, by a load receiver positioned within the weigher casing, the load receiver being part of a power measuring system.

In such weighers with a weighing scale located above the weigher casing, there is provided, for the connection between weighing scale and load receiver, generally in the upper side of the casing, a round hole whose diameter is somewhat larger than the diameter of the connecting piece between weighing scale and load receiver, since it is necessary to take into account the tolerances of the usual two or more piece casing as well as the tolerances of the power measuring system mounted therein. The relatively wide gap thus produced reduces the protective function of the casing against external air drafts and against dust deposits on the measuring system. Furthermore, the interior of the casing of an electronic weigher is, on account of the heat due to energy losses of the electronic structural elements, somewhat warmer than the environment. This may produce in the aforementioned gap, through a chimney effect, an airflow which passes directly along the weighing scale and thus falsifies the weighing result. This effect appears especially in very precise weighers which indicate a milligram or even fractions thereof. It is particularly disturbing in weighers which are provided, around the weighing scales, with a more or less airproof wind protection member which is opened for the purpose of loading the weigher. When the wind protection member is open, a state of flow is produced that differs from that at a closed condition, so that the reaction upon the weighing scale is also different and different data may result, depending on whether the wind protection is open or closed.

Furthermore, it is known to improve the protection of an electronic weight measuring system from external influences by shaping the gap between the connecting piece or pieces between the weighing scale and the load receiver on the one hand and the casing on the other hand as a labyrinth. In this structure, several short cylindrical elements are fastened, concentrically and with changing diameter, alternately to the casing and to the weighing scale. This produces, to be sure, a good dust protection, but the aforementioned disturbing influence of the heated air ascending from the interior of the weigher casing persists, since the aerodynamic resistance of the labyrinth, to be sure, diminishes the velocity of flow of the air, but on the other hand the flowing air transmits a vertical impulse upon the weighing scale at each deflection within the labyrinth. Besides, a labyrinth presents the disadvantage that the air cushion prevailing under the weighing scale is enlarged, so that at temperature differences between this air cushion and the surrounding air the lifting forces upon the weighing scale become stronger.

The purpose of the invention consists therefore in developing an electronic weigher with a weighing scale located above the weigher casing in such a way that the weighing scale with its connection to the load receiver inside the weigher casing is better produced against the influence of airflows and air temperature differences.

According to the invention, this is achieved by means of a structure wherein below the weighing scale and at a short distance therefrom a lower plate is fastened to the weigher casing, furthermore that the lower plate is provided in its center with a hole through which the connecting piece between weighing scale and load receiver passes with a slight lateral play, and that the lower plate is shaped in such a way that between the lower plate and the weigher casing a path with low resistance remains open for air flow between interior and exterior.

By the insertion of the lower plate the air cushion below the weighing scale is reduced to a minimum. Furthermore, because of the lower plate the flow path of the air between the interior of the casing and the exterior is divided into the paths; one path with high resistance to flow through the narrow gap between lower plate and connecting plate between weighing scale and load receiver, and through the small interspace between weighing scale and lower plate, and a second path with low resistance to flow which passes along the lower plate the the weigher casing. The larger part of the air will therefore flow through the path of less resistance to the flow and thus will not come into contact with the weighing scale. The narrow gap between the lower plate and the connecting piece between weighing scale and load receiver is possible in spite of the tolerances of the structural parts and their assembly since the lower plate is adjustably fastened to the casing.

The lower plate should suitably be larger in area than the weighing scale in order to keep the air flowing along between its lower plate and the weigher casing safely away from the weighing scale. This is accomplished with particular success if the lower plate bears an upright collar which is arranged to closely encircle the weighing scale. In addition, because of this upright collar, air flows from the environment of the weigher are deflected away from the weighing scale and affect the latter to a lesser degree. The upright collar rests advantageously upon the lower plate and can be removed therefrom. Thereby it becomes easier to remove the weighing scale, e.g., for travel purposes. Furthermore, apertures are advantageously provided between the upright collar and the lower plate which permit a discharge of liquid that might have entered between the weighing scale and the upright collar. To prevent this liquid which may have entered from passing into the interior of the weigher casing, the lower plate is advantageously provided on its top side with a ring-shaped bulge around the central hole.

Moreover, it is suitable to adapt the top side of the lower plate in its shape to the bottom side of the weighing scale. Thus, the weighing scale and lower plate can be manufactured in the same deep-drawing mold. This does not cause additional molding cost, and the remaining air volume between weighing scale and lower plate becomes particularly small.

When it is especially desirable for the weighing scale to be protected against airflows coming from the outside, it is feasible to provide, as an advantageous further development in addition to the lower plate, a ring in the form of a truncated cone or a cylinder around the lower plate and the weighing scale.

Figure 1:
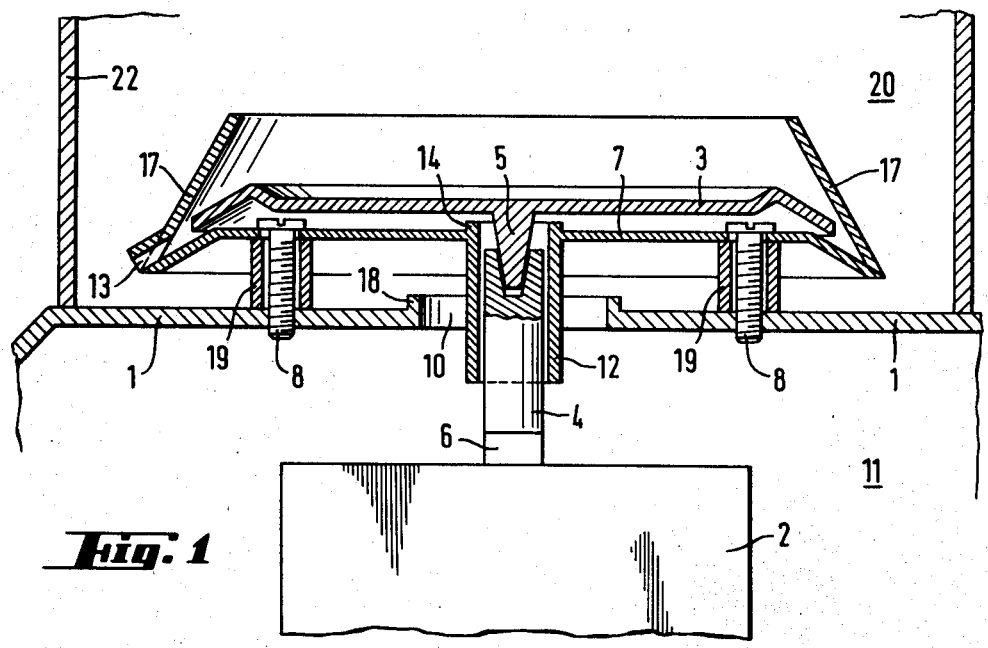
FIG. 1 shows a front elevational sectional view of one embodiment of the electronic weigher.

The electronic weigher in FIG. 1 comprises a largely closed casing 1 which is only partly drawn. It also comprises a power-measuring system 2 which may operate, e.g., according to the principle of electromagnetic power compensation as described, e.g., in DE-OS No. 29 19 227 (U.S. Pat. No. 4,281,731), or may instead by constructed as a string system or a wire strain gauge weighing cell. This power-measuring system 2, merely suggested in FIG. 1, has as a force-introducing point a load receiver 6 to which a weighing scale 3 is fastened via connecting pieces 4 and 5. For the connection the casing 1 is at this point provided with a round hole 10. Below weighing scale 3 a lower plate 7 is provided which is fastened, in a laterally adjustable manner, by screws 8 to weigher casing 1. By means of spacers 19 care is taken that between lower plate 7 and weigher casing 1 a space remains. Likewise a large space is provided between the sleeve 12 of the lower plate and the edge of hole 10 so that between lower plate 7 and weigher casing 1 a path with low resistance to airflow remains open between the interior 11 and the exterior 20 of the weigher casing.

In contrast thereto, the hole in the sleeve 12 of the lower plate is only slightly larger than the outer diameter of connecting piece 4, and the distance between weighing scale 3 and lower plate 7 is also short, so that this second path between interior 11 of the weigher casing and outer space 20 offers a much higher resistance to flow to the air. The air in the interior 11 of the weigher casing which, due to the power loss of the electronic weigher, is somewhat warmer than the environmental air can therefore escape between lower plate 7 and weigher casing without coming into contact with weighing scale 3 and without affecting the weighing result. Nor can the lifting forces of this heated air substantially affect the weighing result since on the one hand the volume of air between weighing scale 3 and lower plate 7 is very small, and on the other hand the air in this area due to the large surfaces presents a minimum of excess temperature.

On lower plate 7, a collar 17 is provided which is arranged to closely encircle weighing scale 3 and extends somewhat over the upper edge thereof. This collar guides air currents away from the weighing scale which might strike the weigher, e.g., during the loading operation when wind protection member 22 is opened. Apertures 13 are produced by some pleats in collar 17 so that liquid that has entered the space between lower plate 7, collar 17 and weighing scale 3 can be discharged. A bulge 14, produced by a short extension of sleeve 12, ensures that this liquid cannot enter the narrow gap between sleeve 12 and connecting piece 4. Likewise a bulge 18 on casing 1 ensures that this liquid cannot enter through hole 10 into the interior of the weigher.

Figure 2:
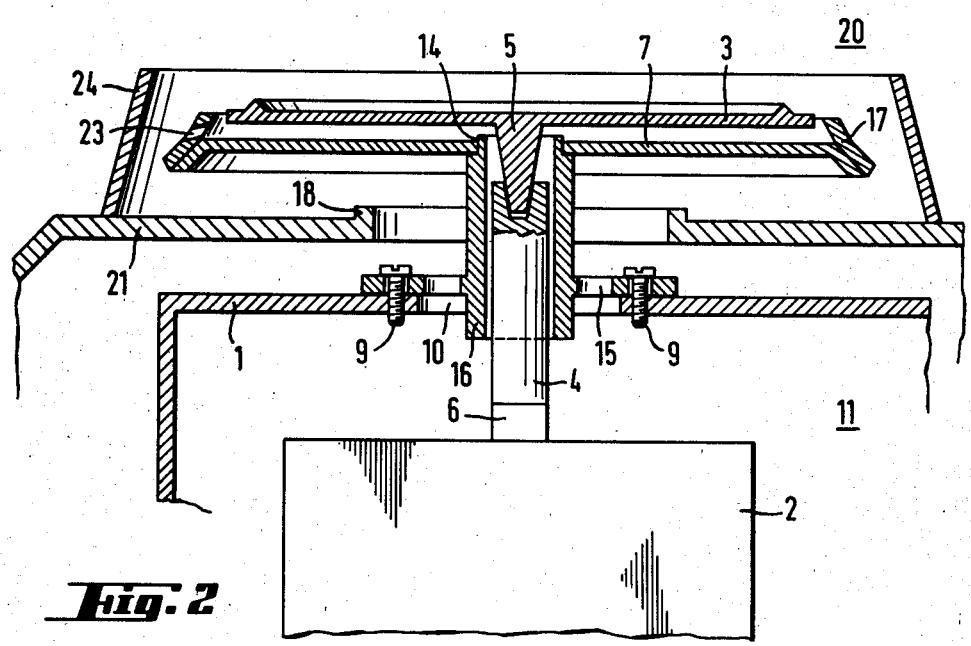
FIG. 2 shows a front elevational sectional view of another embodiment of the electronic weigher.

FIG. 2 shows another embodiment of the electronic weigher. Parts identical to those in FIG. 1 are marked with the same reference numerals. In this embodiment the lower plate 7 is not fastened in its outer area to the casing via spacers as in FIG. 1, but rather to the middle by screws 9. By means of holes 15 in the middle part 16 of the lower plate, an air path with low resistance to flow is again provided between the interior 11 and the outer space 20 of the weigher casing. Likewise the narrow gap between the middle part 16 of the lower plate and connecting pieces 4 an 5 results in a higher resistance airflow path between weighing scale and load receiver, which resistance is further increased by the short distance between lower plate 7 and weighing scale 3.

The casing is in this embodiment constructed in two parts. It consists of an inner wall 1 and an outer wall 21 between which an airspace is present. This structure is particularly favorable in very precise weighers, e.g., in order to protect the dynamometer system from the influence of the heat radiation of the operator. In this two-part casting embodiment the lower plate is fastened at its middle part 16 to the inner wall 1 of the casing, and the lower plate ensures that the air from the interior 11 of the weigher as well as the air between the inner wall 1 and the outer wall 21 can escape with lower resistance to its flow and thus won't affect weighing scale 3. For disassembly of the outer casing 21 the outer part of lower plate 7 can in this embodiment be detached from its middle piece 16.

FIG. 2 shows also an upright collar 17 on the lower plate, in which holes 23 are provided for the discharge of liquid which may have entered. A ring 24 in the form of a truncated cone is mounted on the weigher casing as an additional screening measure against external airflows.

What is claimed is:

1. An electronic weigher with a weighing scale located above a weigher casing and supported, via one or more connecting pieces by a load receiver positioned inside said weigher casing, the load receiver being part of a power measuring system, characterized in that below the weighing scale and at a short distance therefrom a lower plate is fastened to the weigher casing said lower plate being provided with a central hole through which the connecting pieces between said weighing scale and said load receiver pass with a small lateral play, and that the lower plate is shaped in such a way that between the lower plate and said weigher casing a path with low resistance to airflow remains open between the interior and the exterior of said weigher casing.

2. Weigher as in claim 1, characterized in that said lower plate has greater area than the weigher scale.

3. Weigher as in claim 2, characterized in that said lower plate bears and upright collar which is arranged to closely encircle the weighing scale.

4. Weigher as in claim 3, characterized in that the upright collar rests upon said lower plate and is removable therefrom.

5. Weigher as in one of claims 3 or 4, characterized in that between the upright collar and said lower plate apertures are provided which permit a discharge of liquid which might have entered between the weighing scale and the upright collar.

6. Weigher as in claim 1, characterized in that said lower plate is provided on its top side with a ring-shaped bulge around the central hole.

7. Weigher as in claim 1, characterized in that the top side of the lower plate is adapted in its shape to the bottom side of the weighing scale.

8. Weigher as in claim 1, characterized in that a ring in the form of a truncated cone or cylinder is provided around said lower plate and the weighing scale.

* * * * *